No. 890,848. PATENTED JUNE 16, 1908.
J. O. DIXON & E. S. MUMMERT.
SCREW THREADING MACHINE.
APPLICATION FILED JAN. 17, 1907.
5 SHEETS—SHEET 2.
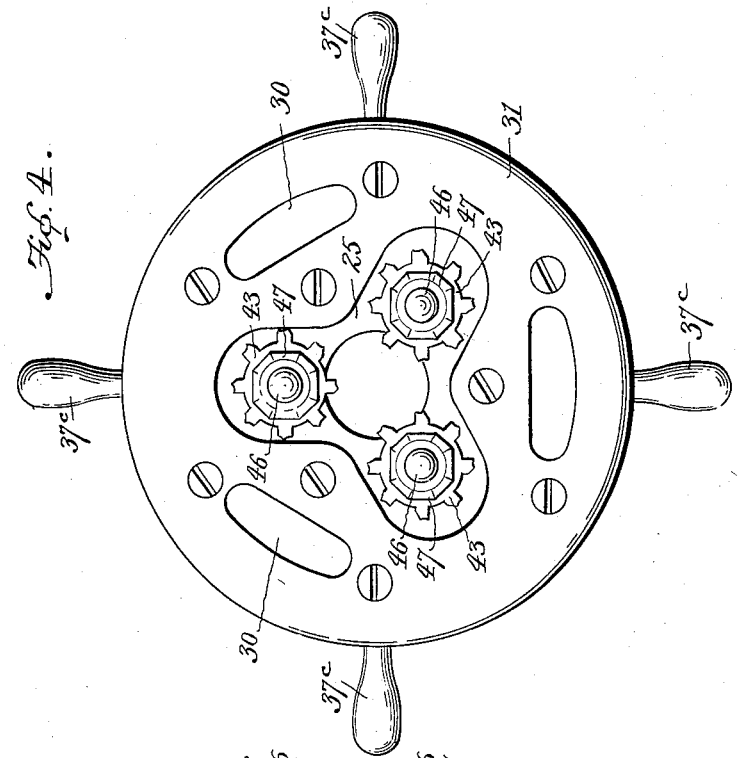
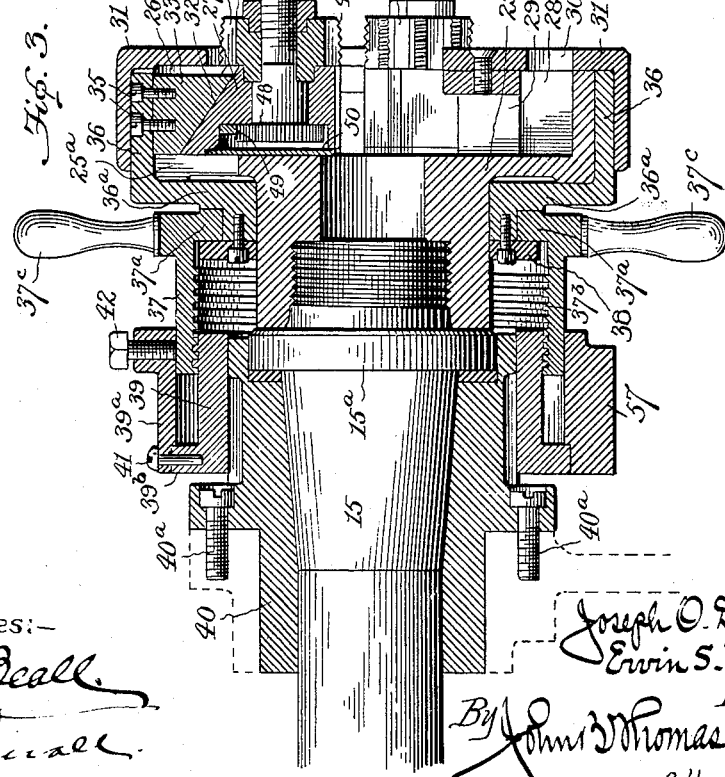
Witnesses:—
Joseph O. Dixon
Erwin S. Mummert
Inventors,
By Johns Thomas & Co.
Attorneys.

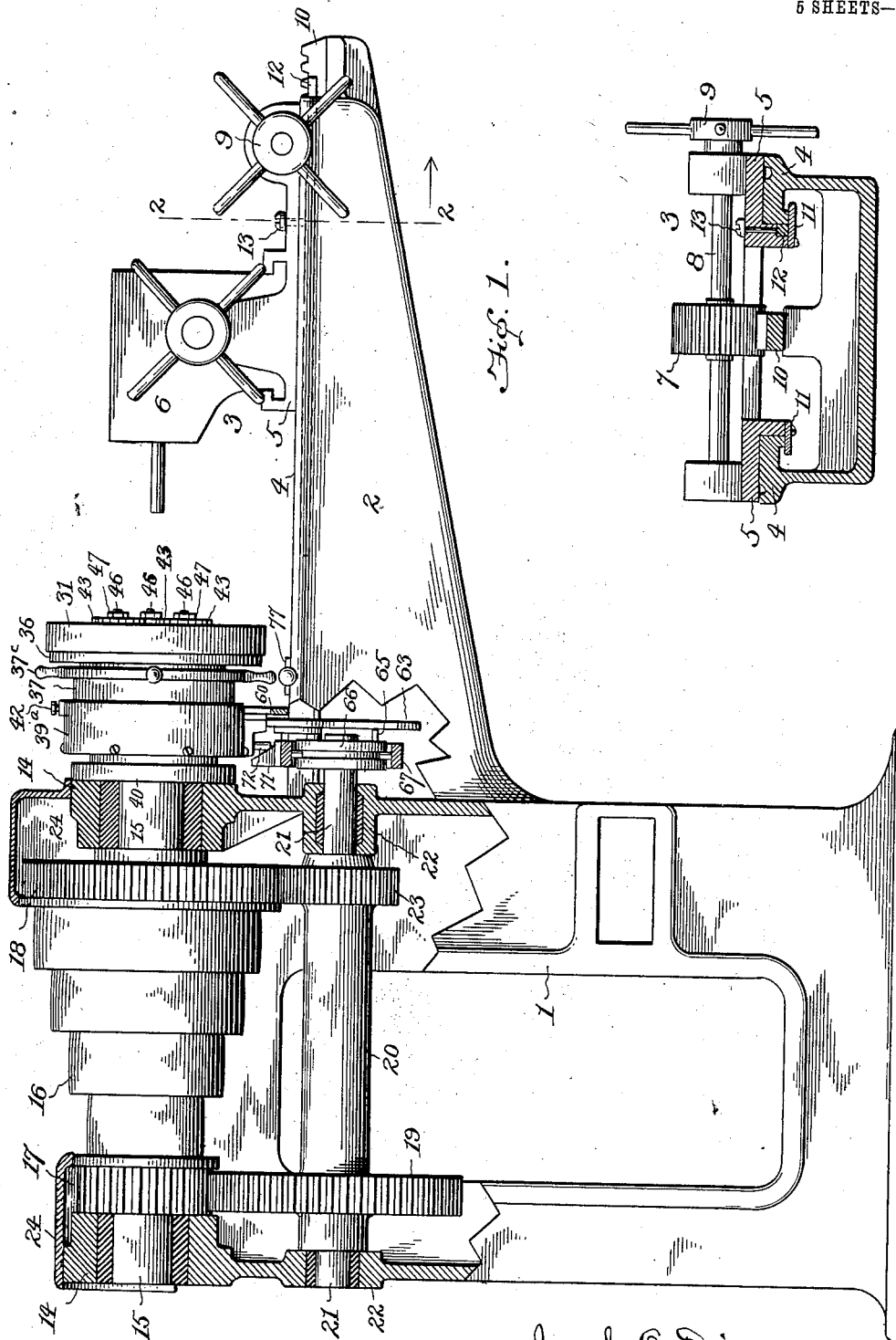

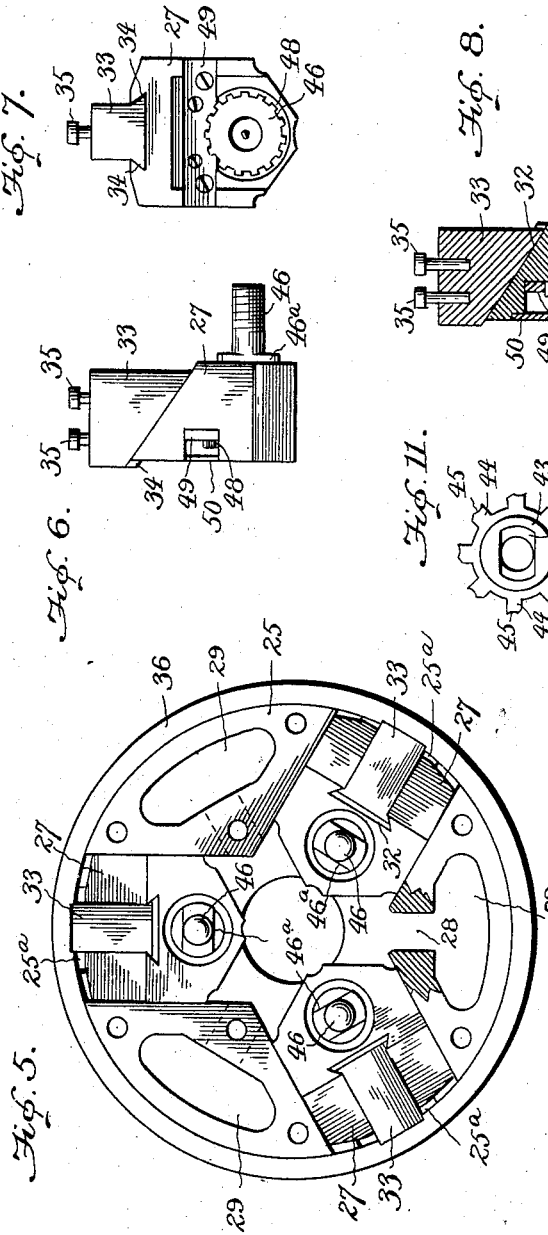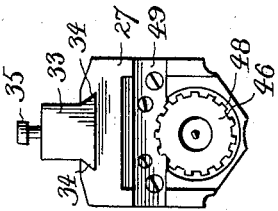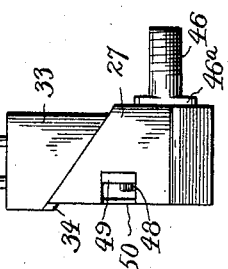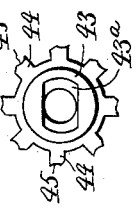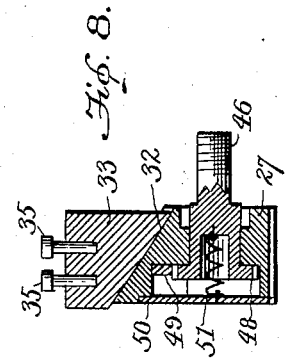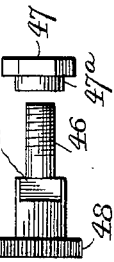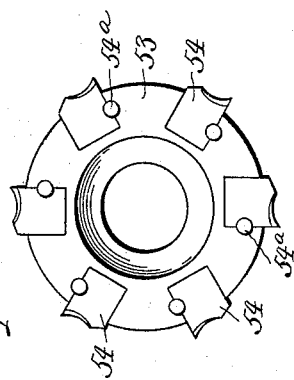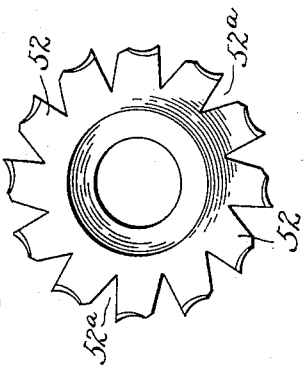

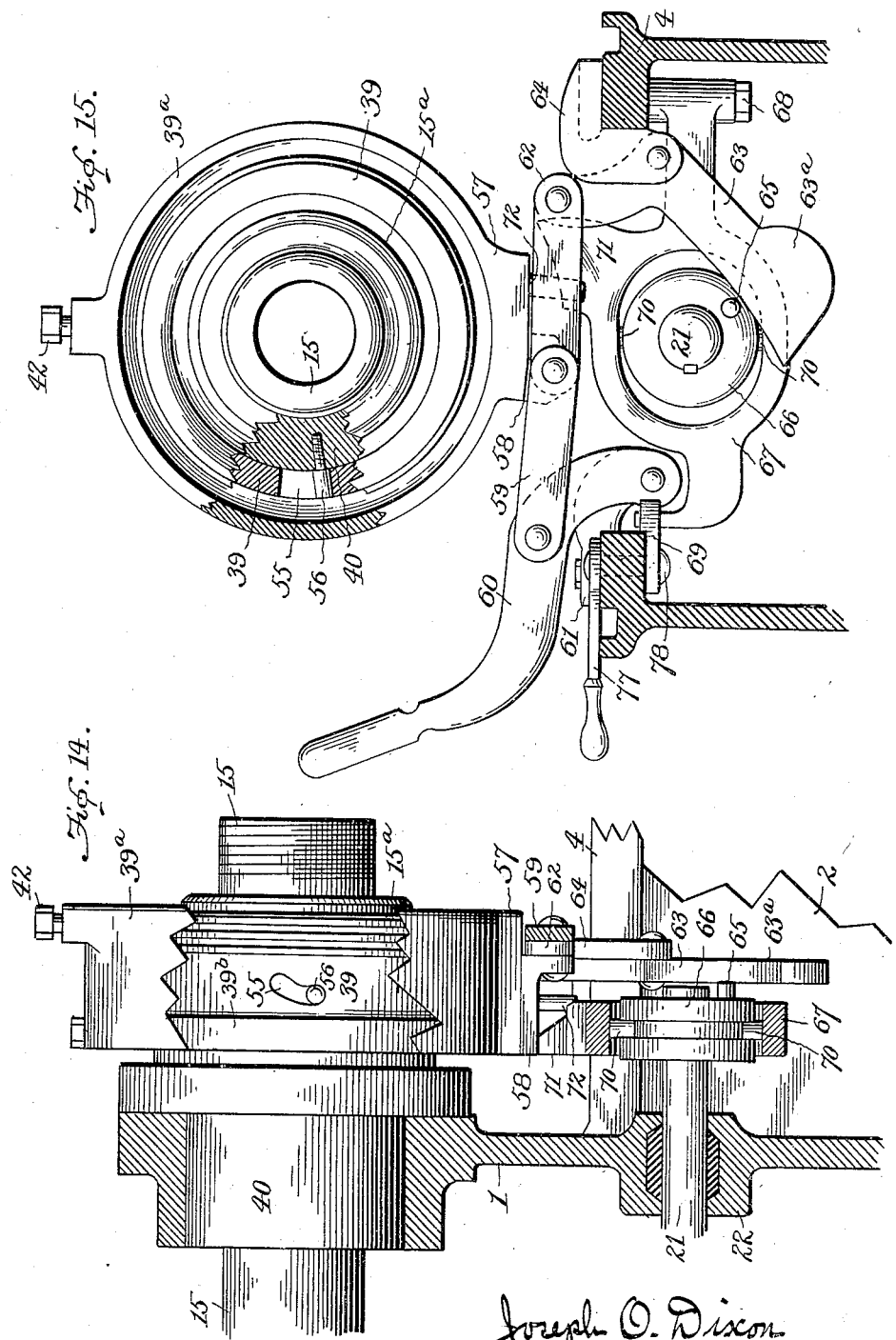

No. 890,848. PATENTED JUNE 16, 1908.
J. O. DIXON & E. S. MUMMERT.
SCREW THREADING MACHINE.
APPLICATION FILED JAN. 17, 1907.
5 SHEETS—SHEET 5.
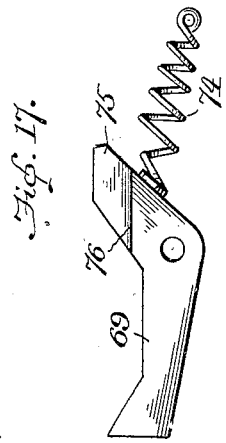
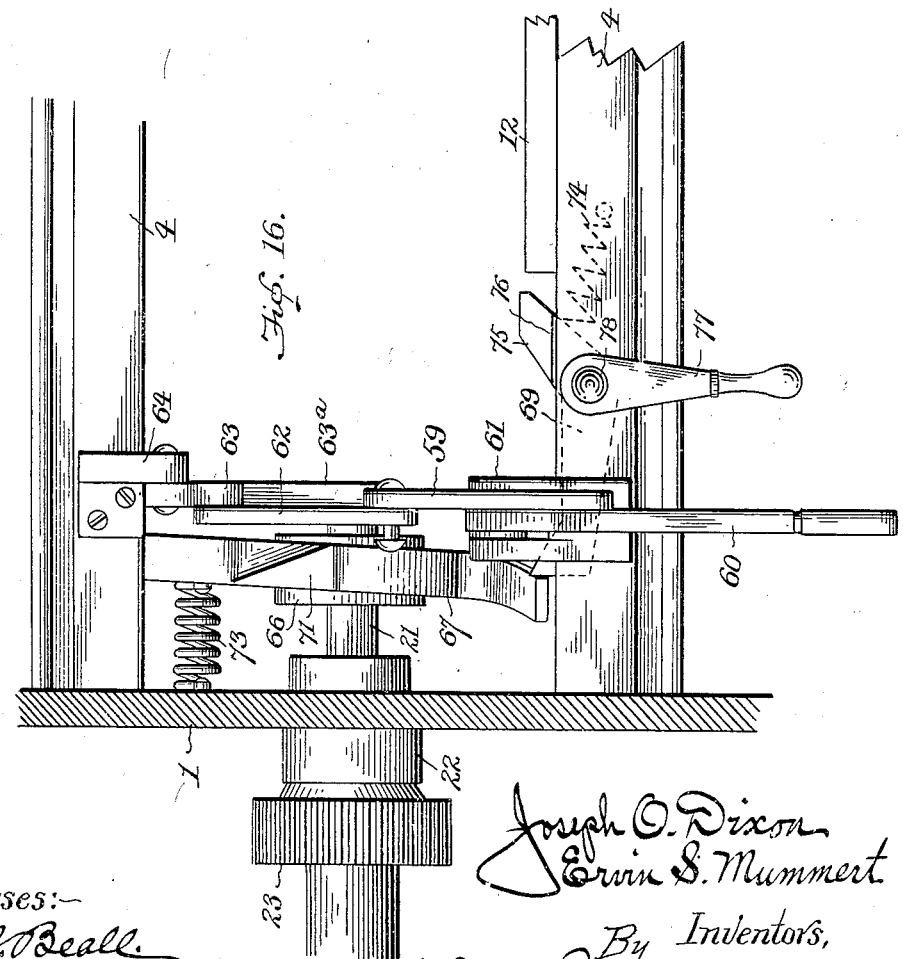
Witnesses:—
Joseph O. Dixon
Ervin S. Mummert
By Inventors,
John F. Thomas & Co.
Attorneys.

UNITED STATES PATENT OFFICE.

JOSEPH O. DIXON AND ERVIN S. MUMMERT, OF HANOVER, PENNSYLVANIA, ASSIGNORS TO MUMMERT, WOLF & DIXON CO., OF HANOVER, PENNSYLVANIA, A FIRM.

SCREW-THREADING MACHINE.

No. 890,848.   Specification of Letters Patent.   Patented June 16, 1908.

Application filed January 17, 1907. Serial No. 352,767.

*To all whom it may concern:*

Be it known that we, JOSEPH O. DIXON and ERVIN S. MUMMERT, citizens of the United States, and residents of Hanover, in the county of York and State of Pennsylvania, have invented certain Improvements in Screw-Threading Machines, of which the following is a specification.

The principal objects of our invention are to provide a screw threading machine for the purpose of threading bolts, rods, etc., which shall be simple and compact in construction, positive and automatic in its operation, and which may be easily adjusted to operate upon rods or bolts of different sizes and produce threads of different lengths and varying depths.

Other though minor objects of the invention will hereinafter appear, and what we claim as novel in the particular construction and combination of parts will be hereinafter specifically set forth in the appended claims.

In the accompanying drawings, which form a part of this specification: Figure 1 is a side elevation, partly in section, illustrating a screw threading machine constructed in accordance with our invention. Fig. 2 is a transverse vertical sectional view on the line 2—2 of Fig. 1. Fig. 3 is an enlarged detail sectional view of the die-head. Fig. 4 is a front view of the die-head. Fig. 5 is a front view of the die-head with the covering plate removed so as to show the adjustable slides which carry the cutting-dies. Figs. 6, 7 and 8 are detail views of one of the die-holders or slides, including the means for adjustably securing the cutting-die thereto. Figs. 9 and 10 are detail views of the securing-bolt and rack-plate which constitute the means for adjustably securing the cutting-dies to the slides. Fig. 11 is a rear view of one of the cutting-dies, showing the bolt opening and recess which receive the securing-bolt. Figs. 12 and 13 are enlarged views of modified forms of cutting dies. Fig. 14 is a side view illustrating certain parts of the die head and the means for automatically separating the cutting-dies. Fig. 15 is a front view of the parts shown in Fig. 14. Fig. 16 is a plan view of the devices employed for automatically separating the cutting-dies. Fig. 17 is a detail view of the tripping dog which is adapted to automatically engage and hold the yoked shifting lever hereinafter referred to.

Like numerals of reference indicate like parts in all the figures of the drawings.

In carrying out our invention the frame 1 of the machine may be of any approved design to provide suitable bearings for the operating shafts, and includes a table 2 upon which moves the carriage 3 for holding and feeding the stock to the dies. The table 2 is provided with the usual tracks or ways 4, upon which the carriage slides.

We lay no claim to novelty in the construction of the carriage, and therefore any form of such device may be employed, the one shown being of an ordinary type and comprises the connected slides 5, the clamping-head 6 in which the stock is held, and the operating pinion 7 mounted on a transverse shaft 8 to the outer end of which is attached the hand-wheel 9, said pinion engaging a longitudinal rack-bar 10 supported at the center of the table 2 between the tracks. The slides 5 of the carriage are provided with the usual depending flanges which bear against the inner edge of the tracks, and to which flanges are attached plates 11 bearing against the underside of the tracks, whereby the carriage is held in close slidable engagement with the tracks. One of the slides of the carriage is recessed longitudinally immediately above the plate 11 so as to receive a bar 12 adapted to operate the automatic shifting devices hereinafter described, and said bar is adjustably secured in the carriage by means of the set-screw 13.

Mounted in the frame of the machine, in the bearings 14, is a horizontal spindle 15 to the front end of which the die-head is connected, and loosely mounted upon said spindle, between the bearings, is a cone-pulley 16 to the rear end of which is attached a pinion 17, while upon the spindle at the front end of the pulley is fixed a gearwheel 18. The pinion 17 is in mesh with a gearwheel 19 at the rear end of a sleeve 20 mounted on a horizontal shaft 21 located below the spindle and journaled in bearings 22 on the frame. At the front end of the sleeve 20 is a pinion 23 which is in mesh with the gearwheel 18. The cone-pulley, gearwheels and pinions just described constitute the driving gear for the spindle so as to reduce the speed of the latter with respect to the driven cone-pulley; it being understood that the driving-belt passes over the pulley and the pinion 17 attached to the latter being in mesh with the large gearwheel 19 on the sleeve 20 turns said sleeve slower than the pulley, and the former being geared to the spindle by the pinion 23 and large gearwheel 18 the speed of the gearing is still further reduced at the point of connection with said spindle. The gearwheels 17 and 18 are preferably covered by a shield 24, which protects them from dirt. It will be noted that this driving gear is all mounted within the frame of the machine, the counter-shaft 21 being hung below the spindle or main driving shaft, thus producing a compact arrangement and providing that the gears may be properly protected.

The forward end of the spindle 15 is threaded to receive the die-head 25 which is secured thereto, being screwed up against an annular flange 15$^a$ formed on said spindle, and this die-head is provided with several radially disposed recesses or slide-ways 26 (Fig. 5), in which are slidably mounted a corresponding number of die-holders or slides 27, the inner ends of the latter being beveled in opposite directions so that they may be brought close together at the center of the die-head. Between the slide-ways the die-head is provided with cavities 28 and communicating openings 29, through which latter the cuttings pass to the cavities and from said cavities out through corresponding openings 30 in the face-plate 31. The face-plate is also provided with openings through which the cutting-dies project, and said face-plate is secured in the front of the die-head by means of screws as shown.

The upper end of each die-holder or slide is provided with an upwardly and rearwardly inclined surface 32 terminating at its sides in dovetailed recesses, and mounted to slide upon this inclined surface is a cam-block 33 having dovetails 34 engaging the corresponding recesses aforesaid, whereby when said block is moved back and forth it will impart a radial movement to the die-holder or slide. The die-head is cut away in rear of the cam-block, as at 25$^a$, to permit of a rearward movement of said block. These cam-blocks are secured by screws 35 to the inner side of a ring 36 which embraces the die-head and has a flange 36$^a$ bearing upon the rear or hub portion of said die-head and adapted to slide thereon. The flange 36$^a$ is provided with an annular groove which receives the inwardly projecting flange 37$^a$ of a rotatable ring 37, the latter flange being held in rotatable engagement with the flange of the ring 36 by means of an annular plate 38 secured to said last mentioned flange. The ring 37 is provided with an internal thread 37$^b$ engaging a corresponding thread on a ring 39, which latter is rotatably and slidably mounted on the cylindrical portion of a bearing-block 40 secured to the frame of the machine by the screws 40$^a$, said block also forming one of the bearings for the spindle.

The ring 39 is provided at its rear end with an upwardly projecting flange 39$^b$ to which is secured a covering band 39$^a$ said band overlapping the rear end of the ring 37 and is provided with a set-screw 42 adapted to impinge upon said ring and hold it against rotation upon the ring 39.

It will be understood that the ring 36 which carries the cam-blocks revolves with the die-head, while the ring 37 which is clamped between the rings 39 and 39$^a$ remains stationary with said rings, so that the aforesaid ring 36 and its cam-blocks are held in an adjusted relation to the die-holders or slides 27, and the latter hold the cutting-dies in an adjusted position with respect to the axis of the die-head. Now by loosening the set-screw 42 and turning the threaded ring 37 in either direction said ring is shifted back or forth by reason of the engagement of the thread thereon with the thread of the stationary ring 39, and as said ring 37 carries with it the ring 36 the cam-blocks which are secured to the latter will adjust the die-holders or slides 27 either toward or from the axis of the die-head, according to the direction the ring 37 is turned. This ring is therefore operated to adjust the dies to the size of the stock, and of course may be turned while the die-head is revolving. After properly setting the dies the operating ring 37 is held fast by means of the set-screw 42. For convenience in turning this operating ring 37 it is provided with a suitable number of handles 37$^c$.

Now for the purpose of separating the cutting dies to release the rod or bolt after it is threaded the connected rings 39 and 39$^a$ are shiftable laterally upon the cylindrical portion of the bearing 40, and of course this may be done either manually or automatically, the devices for accomplishing this operation being hereinafter described.

It will be seen of course that when the connected rings 29 and 39$^a$ are shifted rearward they will impart a rearward movement to the ring 36, the cam-blocks riding upon the inclined surfaces of the die-holders or slides 27 will move the latter towards the center of the die-head or in position to cut a thread upon the size of rod or bolt for which the machine has been adjusted by turning the ring 37 upon the ring 39. When the thread is cut a forward movement of the connected rings 39 and 39$^a$ will impart a forward movement to the rings 37 and 36, and to the cam-blocks 33, and the latter will draw the die-holders or slides 27 outward, thereby separating the dies and releasing the threaded rod or bolt so that it may be readily withdrawn from the die-head. Of course only a slight movement of the parts is required to separate the dies sufficiently to release the threaded rod or bolt, and this manner of operating the die-holders or slides does not disturb the adjustment secured by means of the threaded ring 37. However, during the operation of threading any rod or bolt the ring 37 may be turned to increase or diminish the depth of the thread.

Any form of cutting-die may be employed in connection with the die-head and slides, but we have illustrated several preferred forms. In the form shown in Figs. 3, 4 and 11 the body 43 of the die is provided with several projections 44, each projection being provided at its outer end with a thread cutting face 45 having the usual cutting-teeth. In this manner a plurality of separate cutting faces are provided on each die, and so that when one is worn another may be brought into operative position, and so on until all the thread-cutting faces have been used. To hold this die in fixed engagement with the die-holders or slides 27, and at the same time provide that the several cutting faces may be brought successively in operative position, certain devices are employed, consisting of an adjusting bolt 46 and means for securing the same. The shoulder of the bolt is flattened at opposite sides, as at 46ª (Fig. 9), and in the rear of the die is a corresponding recess, 43ª, to receive this part of the shoulder and so that the die will not be permitted to turn on the bolt, being held in engagement with the flattened shoulder by means of the nut 47. Now to adjust the die to bring any one of the cutting faces in operative position it is only necessary to turn the bolt, and in order therefore to hold the bolt from turning after being once adjusted said bolt is provided with an annular series of teeth 48 which are adapted to engage the teeth of a segmental rack-plate 49, the latter being secured to the die-holder or slide 27 as shown in Fig. 7 of the drawings. To receive the toothed portion of the bolt, as well as the segmental rack-plate, the die-holder or slide is recessed in its rear side, and said recess is preferably covered by means of a plate 50, (Fig. 8). It will be noted that in adjusting the bolt and cutting-die the nut 47 is first loosened and the bolt 46 then pushed rearward until the teeth 48 are beyond the toothed rack-plate 49. The bolt and cutting-die can now be turned to bring the desired cutting face into operative position, after which the nut 47 is screwed up which will bring the teeth of the bolt into engagement with the teeth of the rack-plate, thereby holding the bolt against turning. In order that the cutting-die may be held snugly up into the recess of the die-holder during the adjustment of the same a coiled spring 51 is attached to the bolt and to the plate 50 (see Fig. 8), so that when the nut 47 is unscrewed or loosened the bolt will be drawn rearward by the spring until it disengages the rack, and during this movement the nut pressing against the die will hold the latter up against the die-holder or slide, thus preventing any dirt or cuttings getting in between the die and the slide. The nut 47 has a narrow square portion for the engagement of the usual wrench, and the required thickness for the thread is provided for by having an integral collar portion 47ª, the latter fitting into a recess in the front of the cutting die, as shown. In this manner the nut projects only a slight distance in front of the die, so that in threading a bolt the head of the latter may be brought close up to the dies.

In Figs. 12 and 13 of the drawings we have shown modifications of the cutting die hereinbefore described. In Fig. 12 a large number of projections 52 are formed and separated by V-shaped recesses 52ª, the cutting faces or teeth being formed on the outer edge of said projections, as in the case of the die 43. In Fig. 13 the cylindrical body 53 of the cutting-die is provided in its circumference with transverse grooves which receive blocks 54 which have the cutting faces or teeth, said blocks being held rigidly in place by means of pins 54ª. In this manner when the cutting faces or teeth of all the blocks are worn the die may be removed and the blocks renewed by inserting another set. In this case it is only necessary that the blocks be made of tool steel, and the body of the die may be made of softer steel. In both modifications, however, the body of the die is constructed similar to the die 43; that is to say, provided with the recesses necessary to receive the securing bolt and nut.

As heretofore stated the dies may be opened and closed for releasing the threaded rod or bolt and again bringing them into operative position by operating the ring 39 either manually or automatically through the intervention of the carriage which feeds the rod or bolt to the die-head. To accomplish this automatically insures that each rod or bolt will be threaded for a certain part of its length, and we have therefore provided certain automatic devices which we shall now proceed to describe.

In the first place the ring 39 is provided with a cam-slot 55 into which projects the head of a screw 56 threaded into the stationary bearing-block 40, whereby when the ring 39 is turned it will be shifted laterally a short distance or sufficiently to open the dies the required distance to release the threaded rod or bolt.

Formed on the lower end of the part 39ª of the ring 39 is an enlargement or boss 57 to which is secured a plate 58 having an ear to which is pivoted a link 59 connected to a lever 60, the latter being pivoted to a bracket 61 bolted upon the table 2. This lever provides the means for manually turning the connected rings 39 and 39ª. Also pivoted to the ear on the plate 58 is a link 62 which is connected to a tappet-lever 63 pivoted in a bracket 64 bolted at the other side of the table from lever 60, said tappet-lever having a downwardly and forwardly projecting member 63ª which is operated upon by a tappet 65 projecting from a grooved wheel 66, the latter being splined upon the counter-shaft 21 which forms part of the driving-gear. Encircling the grooved tappet-wheel 66 is a yoked lever 67 which is hinged at one end on a bolt 68 depending from one of the tracks of the table, and at its other end is curved upwardly so as to be engaged by a dog 69 pivoted to the under side of the other track of the table. The yoke portion of this lever is provided with pins 70 which engage the groove in the tappet-wheel, and the lever is movable laterally so as to shift the tappet-wheel and bring the tappet or pin 65 in and out of operative relation with the tappet-lever. The yoked lever is provided near its pivot end with a cam projection 71, one side of which is beveled or inclined, as shown, and upon this cam-projection rides a pin 72 projecting from the ring 39 39ª, which pin is adapted to shift the yoked lever rearward so as to be engaged by the dog and hold the tappet out of operative relation to the tappet-lever 63.

The yoked lever is actuated in one direction, or forwardly, to move the tappet-wheel in operative relation to the tappet-lever by means of an expansion spring 73 (Fig. 16), which spring is interposed between the yoked lever and frame of the machine.

The dog or catch 69 is pivoted to the underside of one of the tracks of the table 2, as shown in Fig. 16, and the end which engages the yoked lever is beveled so that the latter may automatically engage the same, the catch or dog being actuated by a spring 74. In order to provide for automatically releasing the catch or dog it is provided at its pivot end with a projection 75, which extends beyond the inner edge of the track and in the path of the bar 12 on the carriage. This projection is formed with an upwardly projecting boss or shoulder 76 which abuts against the track and limits the throw of the dog. It will be seen that the bar 12 is adapted to automatically trip the dog or catch when the carriage is moved towards the die-head a certain distance, and that when said dog is tripped the yoke is released and actuated by the spring 73 to move the tappet-wheel so that the tappet or pin thereon will engage the tappet-lever 63. It will also be noted that the outer end of the tappet-lever is of such width that should the tappet-wheel be shifted forwardly when the pin is in its lowermost position the outer end of said pin will ride upon the inner side of said lever until it moves beyond the upper edge of the lever, and so that it will engage said upper edge upon its next revolution.

Referring to Fig. 15, the parts are shown in the position they occupy when the dies are open. To close the dies the lever 60 is pushed forward which turns the ring 39 and by reason of the cam-slot 55 and pin 56 said ring is moved rearward carrying the rings 37 and 36, the latter closing the dies through the intervention of the cam-blocks 33. In this position the pin 72 will not interfere with the forward movement of the yoked-lever when the dog is tripped. Now when the rod or bolt is threaded to such an extent that the bar 12 contacts with the dog 69 the latter is tripped and releasing the yoked lever 67 the latter is moved forwardly by the action of the spring 73 and imparting a corresponding movement to the tappet-wheel the pin on the latter will engage the tappet-lever 63 and operate the same so as to turn the ring 39 and open the dies. It will be seen therefore that this operation is entirely automatic. If at any time during the operation of threading a rod or bolt it is desired to open the dies the catch or dog 69 may be tripped manually by operating the lever 77. When the yoked-lever is engaged by the catch or dog, as shown in Fig. 15, the dies may be opened and closed by simply manipulating the lever 60.

From the foregoing description the construction, operation and practical advantages of our invention will be readily understood.

Having described our invention, what we claim is:—

1. In a screw-threading machine, the combination with the die-head having radial recesses or ways, of die-holders slidably mounted in said recesses or ways, means for radially moving the die-holders, a shiftable ring attached to said means, a threaded ring rotatably engaging the shiftable ring, a threaded ring with which the thread of the rotatable ring engages, means for locking said rings together, and means for moving them laterally.

2. In a screw-threading machine, the combination with the die-head having a rearwardly-projecting hub and radial recesses or ways in its face, of die-holders slidably mounted in said recesses or ways, means for radially moving the die-holders, a laterally shiftable ring connected to said means and having a flange slidable upon the hub of the die-head, said flange having an annular recess, a ring having an inwardly-projecting flange rotatably engaging the annular recess or channel and provided with a thread, a band shiftably mounted on a fixed support and having a thread with which the thread of the rotatable ring engages, and means for operating the shiftable band.

3. In a screw-threading machine, the combination with the die-head having radial recesses or ways in its face, of die-holders slidable in said recesses or ways and each having an inclined surface, cam-blocks slidably engaging the inclined surfaces of the die-holders, a laterally movable ring to which the cam-blocks are secured, a ring rotatably engaging the laterally movable ring and having a thread, a ring shiftable laterally upon a support and having a thread with which the thread of the rotatable ring engages to adjust said rotatable ring laterally, means for locking the threaded rings together, and means for operating the shiftable ring.

4. In a screw-threading machine, the combination with the die-head having a work-opening, of die-holders mounted in the die-head and movable with respect to the work-opening, a laterally movable ring and connections for moving the die-holders, a ring rotatably engaging the laterally movable ring, a stationary support, a ring shiftable laterally upon the support, and connecting means operative upon rotation of the rotatable ring for adjusting the relative positions of the shiftable and rotatable rings, substantially as shown and for the purpose set forth.

5. In a machine of the character described, the combination with a slide having a bolt-hole therein, a bolt slidably engaging the bolt-hole in the slide and having teeth at one end and threaded at the other end, a multiple die connected to the bolt and rotatable therewith, a rack-plate secured to the slide and with which the teeth on the bolt slidably engage, and a nut threaded on the other end of the bolt to clamp the parts together.

6. In a machine of the character described, the combination with a die-holder having a bolt-hole, of a rotatable multiple die having a bolt-hole and a recess at one end thereof communicating with said bolt-hole, a bolt adapted to slidably engage the bolt-holes in the die-holder and die and having a portion engaging the recess in the latter, teeth on said bolt, and a rack-plate secured to the die-holder and with which the teeth on the bolt engage by a slidable movement of the latter.

7. In a machine of the character described, the combination with a die-holder having a bolt-hole, of a rotatable multiple cutting-die having a bolt-hole therethrough and a recess at one end communicating with said bolt-hole, a bolt adapted to slidably engage the bolt-holes in the die-holder and die and having a portion engaging the recess in the latter, teeth on said bolt, a fixed rack-plate with which the teeth are adapted to engage, a spring adapted to move the bolt out of engagement with the rack-plate, and means for holding the bolt in engagement with the rack-plate.

8. In a machine of the character described, the combination with a die-holder having a bolt-hole, of a multiple die having a bolt-hole therethrough and a recess at one end communicating with said bolt-hole, a bolt adapted to slidably engage the bolt-holes in the die-holder and die and having a portion engaging the recess in the latter, said bolt being threaded and provided with circumferential teeth, a rack-plate secured to the die-holder and with which the teeth on the bolt are adapted to engage, and a nut threaded on the bolt to cause the engagement of the teeth with the rack-plate.

9. In a machine of the character described, the combination with a die-holder having a bolt-hole, of a multiple die having a bolt-hole therethrough and a recess at one end communicating with said bolt-hole, a bolt adapted to slidably engage the bolt-holes in the die-holder and die and having a portion engaging the recess in the latter, said bolt being threaded and provided with circumferential teeth, a rack-plate secured to the die-holder and with which the teeth on the bolt are adapted to engage, a spring connected to the bolt and adapted to move the same out of engagement with the rack-plate, and a nut threaded on the bolt to move and lock the same in engagement with said rack-plate, substantially as shown and described.

10. In a machine of the character described, the combination with a die-holder having a bolt-hole countersunk at its inner end forming a cavity, of a multiple die having a bolt-hole therethrough and a recess at one end communicating with said bolt-hole, a bolt adapted to slidably engage the bolt-holes in the die-holder and die and having a portion engaging the recess in the latter, said bolt being threaded at its outer end and provided with circumferential teeth at its inner end, a rack-plate secured in the cavity in the die-holder so that the teeth on the bolt may engage therewith, a covering-plate secured to the die-holder over the cavity, a spring connected at one end to the covering-plate and at the other end to the bolt and adapted to move the latter out of engagement with the rack-plate, and a nut threaded on the outer end of the bolt against the face of the die and adapted to move the bolt in engagement with the rack-plate, substantially as shown and described.

11. In a screw-threading machine, a laterally movable die-controlling ring and mechanism for moving it comprising an operating lever connected to said ring, a laterally movable tappet-wheel having a tappet adapted to operate the lever, driving-gear for rotating the tappet-wheel, and means for moving the tappet-wheel in and out of operative relation to the lever, substantially as shown and described.

12. In a screw-threading machine, a laterally movable die-controlling ring and mechanism for moving it comprising an operating lever connected to the ring, a rotatable shaft and means for turning the same, a tappet-wheel splined to and slidable upon said shaft and having a tappet adapted to operate the lever when said wheel is moved to one of its positions, a spring for moving the tappet-wheel in one direction, and means for moving said tappet-wheel in the other direction against the action of the spring, substantially as shown and described.

13. In a screw-threading machine, a laterally movable die-controlling ring and mechanism for moving it comprising an operating lever connected to the ring, a shaft and means for rotating the same, a tappet-wheel splined to and slidable upon said shaft and having a tappet adapted to operate the lever when said wheel is moved to one of its positions, a spring for moving the tappet-wheel into operative position with respect to the lever, means for moving the tappet-wheel into an inoperative position against the action of the spring, and a catch for holding the tappet-wheel in the latter position.

14. In a screw-threading machine, a laterally movable die-controlling ring and mechanism for moving it comprising an operating lever connected to the ring, a shaft and means for rotating the same, a tappet-wheel splined to and slidable upon said shaft and having a tappet adapted to operate the lever when said wheel is moved to one of its positions, a spring for moving the tappet-wheel into operative position with relation to the lever, means for moving the tappet-wheel into an inoperative position against the action of the spring, a catch for holding the tappet-wheel in the latter position, and means for releasing said catch, substantially as shown and described.

15. In a screw-threading machine, a laterally movable die-controlling ring and mechanism for moving it comprising an operating lever connected to the ring, a shaft and means for rotating the same, a tappet-wheel splined to and slidable upon said shaft and having a tappet adapted to operate the lever when said tappet-wheel is moved to one of its positions, a shifting lever connected to the tappet-wheel, a spring for actuating the shifting-lever in one direction, means for actuating said lever in the other direction, a catch for holding the shifting-lever in the latter position, and means for releasing said catch, substantially as shown and described.

16. In a screw-threading machine, a laterally movable die-controlling ring and mechanism for moving it comprising an operating lever connected to the ring, a shaft and means for rotating the same, a tappet-wheel splined to and slidable upon said shaft and having a tappet adapted to operate the lever when said tappet-wheel is moved to one of its positions, a spring adapted to move the tappet-wheel into operative position with relation to the lever, means operated by the shiftable ring for moving the tappet-wheel out of operative position with relation to the lever, a catch for holding the tappet-wheel in the latter position, and means for releasing the catch, substantially as shown and described.

17. In a screw-threading machine, a laterally movable die-controlling ring and mechanism for moving it comprising an operating lever connected to the ring, a shaft and means for rotating it, a tappet-wheel splined to and slidable upon said shaft and having a tappet adapted to operate the lever when said tappet-wheel is moved to one of its positions, a shifting-lever connected to the tappet wheel and having a cam-projection, a spring actuating said shifting-lever to move the tappet-wheel into operative position with relation to the lever, a pin on the aforesaid shiftable ring adapted to engage the cam-projection of the shifting-lever and move the tappet-wheel to an inoperative position, a catch adapted to engage the shifting-lever when moved to the latter position, and means for releasing said catch.

In testimony whereof we have signed our names to this specification in the presence of two subscribing witnesses.

JOSEPH O. DIXON.
ERVIN S. MUMMERT.

Witnesses:
JOHN B. MILLER,
A. E. BUCKMINSTER.